June 18, 1968  J. L. LOGAN  3,388,458
INSULATION MEANS AND MOISTURE SEALING OF ARMATURES
Filed June 3, 1964  4 Sheets-Sheet 1

METHOD OF SEALING ARMATURES AGAINST MOISTURE

DIPPING OR COATING THE BARE ARMATURE CORE AREAS WITH "B" STAGEABLE HEAT-REACTIVE INSULATING MATERIAL.

↓

WINDING THE ARMATURE WITH COILS HAVING CONDUCTORS BASICALLY COATED WITH HEAT-STABLE RESIN MATERIAL.

↓

SEATING COILS IN CORE SLOTS WITH OPPOSITE END TURN SUPPORTS.

↓

WEDGING COIL CONDUCTORS IN ARMATURE SLOTS.

↓

APPLYING SILICONE-RUBBER-TYPE MATERIAL RADIALLY AT PREDETERMINED LOCATIONS EXEMPLIFIED BY OPPOSITE ENDS OF ARMATURE CORE AS WELL AS AXIALLY SPACED THEREFROM AT COMMUTATOR RISER AND PINION END PORTIONS ADJACENT TO END TURN SUPPORTS.

↓

SHEETING POLYTETRAFLUOROETHYLENE COVERING MATERIAL PERIPHERALLY BETWEEN THE LOCATIONS AT OPPOSITE ENDS AXIALLY OF THE ARMATURE CORE ALONG COIL END TURN AREAS.

↓

INTERMEDIATELY COVERING POLYTETRAFLUOROETHYLENE MATERIAL WITH A GLASS-BACKED SILICONE RUBBER (CURED) SHEET AROUND END TURN AREAS.

↓

GLASS BANDING OUTER SURFACING OF COIL END TURN AREAS.

↓

HEATING FOR PREDETERMINED TIME WITHIN A RANGE OF TEMPERATURE FOR BONDING AND POSITIVELY SEALING TOGETHER IN A FINALLY CURED UNITARY MASS INCLUDING THE "B" STAGEABLE HEAT-REACTIVE INSULATING MATERIAL RADIALLY INWARDLY OF END TURN AREA AND SILICONE-RUBBER-TYPE MATERIAL, POLYTETRAFLUOROETHYLENE COVERING, GLASS-BACKED SILICONE RUBBER SHEET AND GLASS BANDING RADIALLY OUTWARDLY THEREOF.

*Fig.1*

INVENTOR.
JOHN L. LOGAN
BY
ATTORNEY

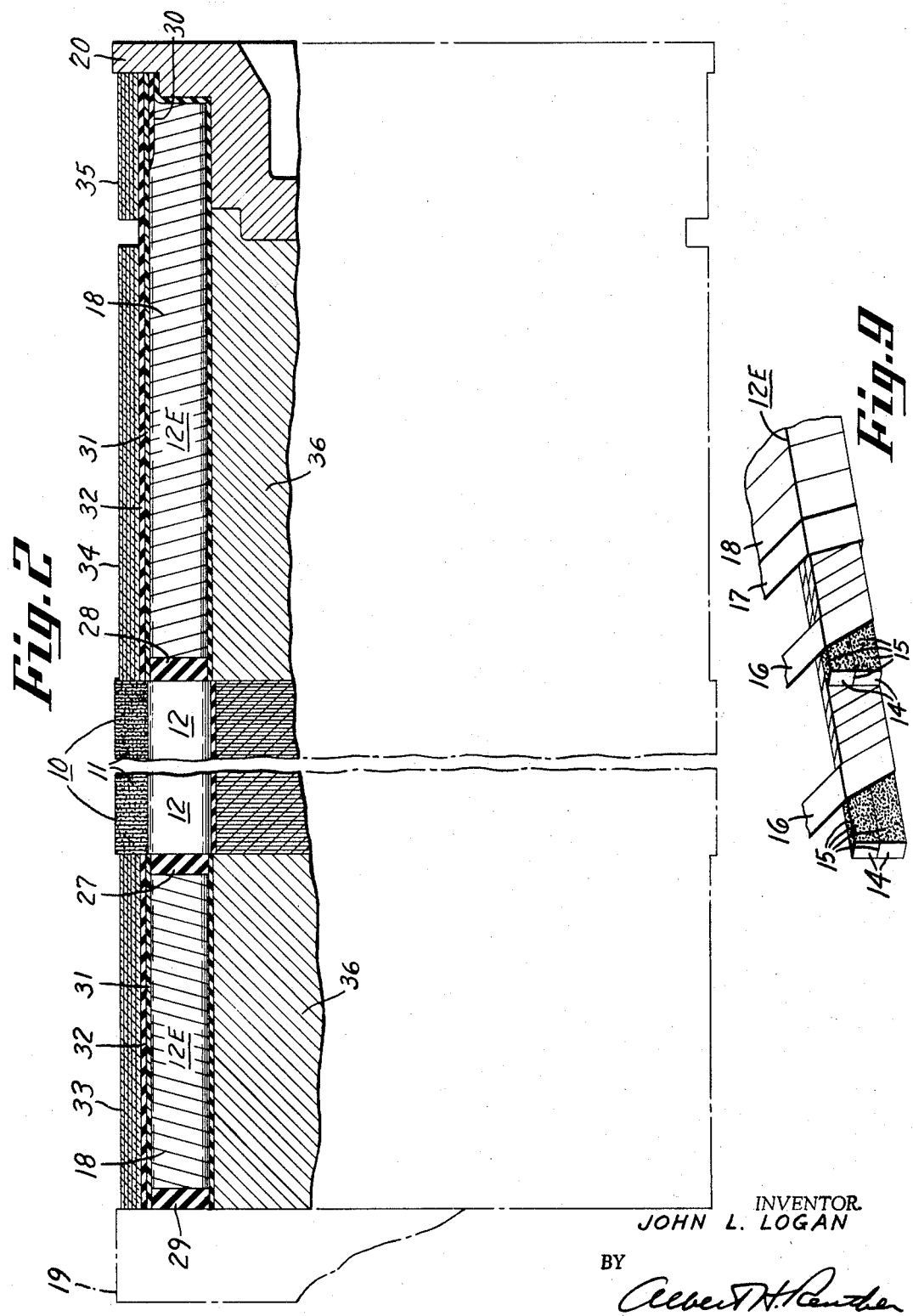

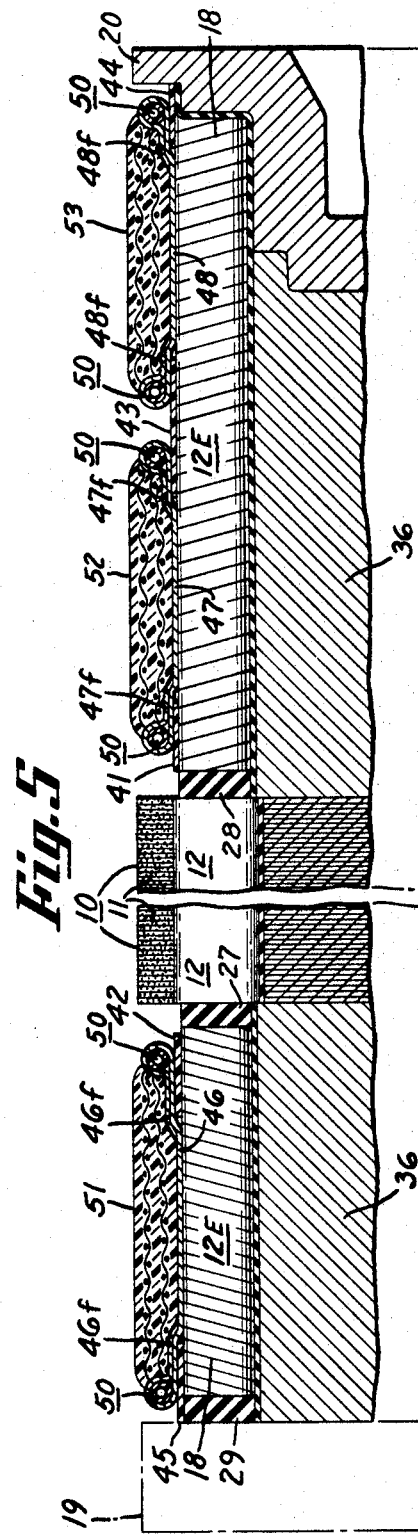

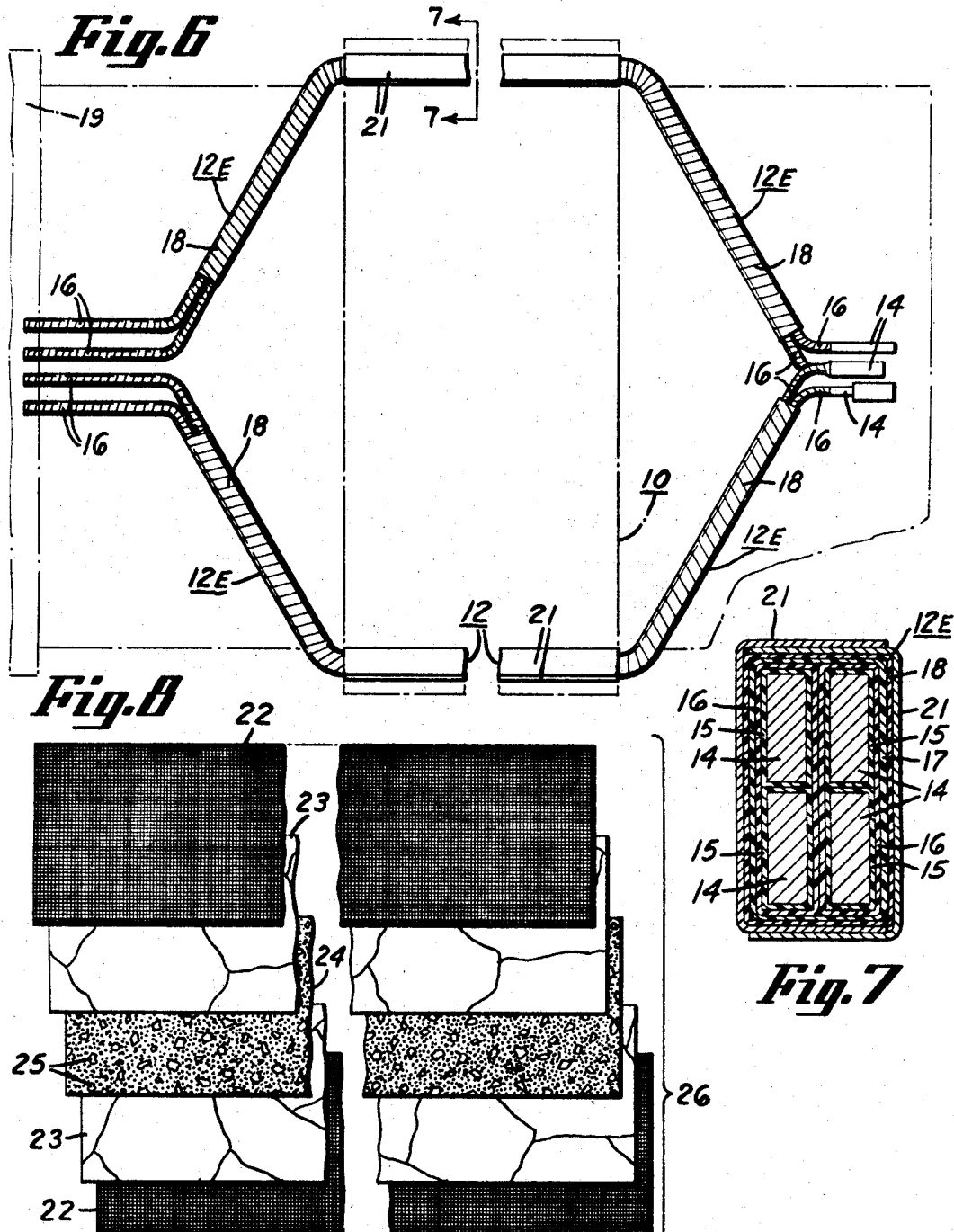

United States Patent Office 3,388,458
Patented June 18, 1968

3,388,458
INSULATION MEANS AND MOISTURE SEALING
OF ARMATURES
John L. Logan, Western Springs, Ill., assignor to General
Motors Corporation, Detroit, Mich., a corporation of
Delaware
Filed June 3, 1964, Ser. No. 372,293
8 Claims. (Cl. 29—596)

ABSTRACT OF THE DISCLOSURE

This invention relates to a method for moisture sealing direct current armatures comprising the steps of:
  (a) Dipping or coating the bare armature core areas with a "B" stageable heat-reactive insulating varnish.
  (b) Winding the armature with coils having the conductors basically coated with "Pyre ML" polymer, or any other designated heat-stable resin coating. Coils are also insulated with a conventional insulation system.
  (c) After winding, coils are seated in core slots.
  (d) Armature is wedged.
  (e) Armature is prepared for application of commutator end and pinion end bands.
  (f) Bands are applied in the following sequence:
  (1) A silicone rubber compound is applied to the following areas:

Back of commutator riser.
Pockets adjacent to core—both commutator end and pinion end diamond areas.
Adjacent to pinion end bell (motors).
  (2) Apply "Teflon" sheet—covering entire commutator end and pinion end diamond areas.
  (3) Apply glass-backed silicone rubber (cured )sheet—covering entire commutator end and pinion end diamond areas.
  (4) Apply glass bands—covering entire commutator end and pinion end diamond areas.
  (5) Cure bands—bake armature minimum of six (6) hours at 160 to 170 degrees C.

This invention relates to insulating of armatures, and, more particularly, to both edging of banded armature winding means as well as method of moisture sealing armatures.

During banding of armature winding means there can be difficulty in uniform resin distribution generally and along band edging. Also there is need for a method providing an effective moisture seal for rotating electrical machine armatures free of any final varnish-impregnation or varnish dip. Accordingly, an object of the present invention is to provide a new and improved sealing method against moisture and the like as well as edging-restraint means for resin uniformity both to minimize expense of material and labor.

Another object of this invention is to provide a method of sealing armature assemblies against moisture in steps including initial covering by dipping, coating and the like bare armature core areas with a solvent-based heat-reactive material such as varnish, resin and the like made tacky in "B" stage during brief baking to drive off volatiles; winding the armature with coils having conductors basically coated with polyamide-polymer heat-stable resin material subject to baking to soften insulation and coil seating in slots by pressure; wedging armature conductors of coils into slot positioning; applying banding for coil end turns by filling silicone rubber compound to rear of commutator riser as well as pockets adjacent to core of both commutator and rear ends of diamond-shaped conductor wiring end turn areas as well as adjacent to rear end bell portion of motor means, by sheeting of fluoride-containing or silicone rubber material to cover entire commutator and rear ends to have diamond-shaped conductor wiring end turns thereon, by applying resin-impregnated glass banding to cover entire commutator and rear ends where diamond-shaped conductor wiring end turns are positioned upon end-turn area supports located between the core and commutator and between the end bell and core, respectively; and finally curing by armature baking for a predetermined time and range of temperature in positive sealing relationship due to bonding thereby between sheeting and silicone rubber compound in addition to seal by initial covering of the armature core with the heat-reactive material.

Another object of this invention is to provide for armature sealing against moisture by having an initial covering by dipping, coating and the like bare armature core areas with a solvent-based heat-reactive organic material such as an organic compound derived from diphenol oxide having carbon atoms in an aromatic ring-shaped structure with toluol as resin solvent made tacky in "B" stage during brief baking to drive off volatiles; winding the armature with coils having conductors basically coated with polyamide-polymer heat-stable resin material based on a N-methylpyrrolidone dimethylacetamide/toluol solvent system subject to baking to soften insulation and coil seating in slots by pressure; wedging armature conductors of coils into slot positioning; applying banding for coil end turns by filling silicone rubber compound to rear of commutator riser as well as pockets adjacent to core of both commutator and rear ends of diamond-shaped conductor wiring end turn support areas as well as adjacent to rear end bell portion of motor means, by sheeting of polytetrafluoroethylene material to cover entire commutator and rear ends to have diamond-shaped conductor wiring end turns thereon, by applying resin-impregnated glass banding to cover entire commutator and rear ends where diamond-shaped conductor wiring end turns are positioned; and finally curing by armature baking for a predetermined time such as a minimum of six hours at a temperature ranging between 160 and 170 degrees centigrade in positive sealing relationship due to bonding thereby between sheeting and silicone rubber compound in addition to seal by initial covering of the armature core with the heat-reactive material.

A further object of this invention is to provide dynamoelectric machine banding edge restraining means to control exactness of band width in addition to providing better uniformity of resin distribution and elimination of resin-poor areas along banding edging around end turns of armature winding means.

Another object of this invention is to provide rounded opposite annular banding edges on dynamoelectric machine armatures including winding means having end turns held radial by resin saturated uni-directional fiberglass tape means over a base of woven asbestos band edging restraint means folded back over plastic tubing that defines limits of opposite edges at least partially having fluoride containing sheeting therewith in predetermined locations without need for special tooling such as metal rings and avoiding insulation wear due to expansive-contractive movement of winding end turns during machine operation.

Further objects and advantages will be apparent from the following description, reference being made to the accompanying drawings wherein preferred embodiments of the present invention are clearly shown.

In the drawings:

FIGURE 1 is a procedural diagram to illustrate armature sealing in accordance with the present invention.

FIGURE 2 is a fragmentary elevational view of a dynamoelectric machine armature means having opposite ends moisture sealed in accordance with the present invention.

FIGURE 3 is a cross-sectional view of one embodiment of edge restraining means for use on armature means having end turn resin banding.

FIGURE 4 is a cross-sectional view of another embodiment of edge restraining means for use on armature means having end turn resin banding.

FIGURE 5 is a fragmentary elevational view of a dynamoelectric machine armature means having edge restraining means installed with resin banding and base arrangement in accordance with the present invention.

FIGURE 6 is a plan view of an armature coil assembly usable in the magnetic core of FIGURES 2 and 5.

FIGURE 7 is a cross-sectional view taken along line 7—7 in FIGURE 6.

FIGURE 8 is an exploded fragmentary view of moldable insulation material for channel means shown in FIGURES 6 and 7.

FIGURE 9 is an enlarged perspective view of progressive armature coil assembly shown also in FIGURES 6 and 7.

FIGURE 1 provides a procedural diagram to illustrate armature sealing for dynamoelectric machines in accordance with the present invention. Reference can be made to structural views of FIGURES 2–9 inclusive showing components for which certain features are applicable. Thus a magnetic core or slotted lamination assembly generally indicated by numeral 10 in FIGURE 2 is initially subjected to a step of dipping or coating of bare armature core slot and tooth areas with an uncured partially polymerizable or "B" stageable heat-reactive insulating varnish exemplified by an organic resin compound derived from diphenyl oxide having its carbon atoms arranged in a ring-shaped or "aryl" molecular structure. A solvent used with this resin is toluol. This solvent-based insulating varnish or resin is commercially available under a trade name "Doroyl" (BT–3397) and a reference numeral 11 identifies layering added to the core 10 by such dipping or coating of the bare armature surfacing or core areas then given a short bake or heating cycle to drive off volatiles for the "B" stage varnish or resin material.

Next there is a step of winding the armature with coils indicated generally by numeral 12 in FIGURE 2 and including internal conductor portions 14 as indicated in views of FIGURES 7 and 9. These individual conductor portions 14 per se are of a split-conductor type to which an uncured polymer or "polyimide" varnish or resin material is coated as a basic moisture seal. This polymer material is derived from reaction of pyromellitic dianhydride with aromatic diamines. Solvent for such resin material is composed of two parts N-methylpyrrolidine and one part dimethylacetamide. This material is commercially available under a trade name "Pyre-ML" polymer from Dupont and Company and in FIGURE 9 a reference numeral 15 is provided to identify this basic moisture seal coating of the coated magnet wire or conductors 14. Individual coil strap means of split-conductor type can be prepared in pairs each having a spiral wrapping of film tape or film-mica-fiberglass tape indicated by reference numeral 16 in FIGURES 6 and 9. Plural pairs of such conductors or magnet wire portions can be joined in groups of 4, 6 or more as indicated in FIGURE 9 by provision of a film cell wrapper or film-mica-fiberglass cell wrapper as ground insulation indicated by numeral 17 in FIGURE 9 provided also with an outer fiberglass tape covering 18 in FIGURE 9. This outer covering 18 is also indicated in end turn portions 12 E to designate triangular or diamond-like insulated structure which projects axially and substantially longitudinally of the armature or magnetic core as indicated in FIGURE 2. These end turn portions 12 E can be located on end turn area supports on opposite sides of the armature core and extending radially outwardly therefrom in spacing between the magnetic core 10 and a commutator riser means 19 on one side and a pinion end bell 20 on the other side.

It is to be understood that preferably the conductor portions are provided with the polymer insulation or "Pyre-ML" resin which together with the film material of the wrapping 17 as well as tape 16 come from the "polyimide" group of materials derived from a reaction previously noted. The use of such polyimide film coating also on individual conductors of the armature coil assemblies makes possible the use of "split" conductors insulated from each other and such film is capable of withstanding temperatures in excess of 250° centigrade. This film provides also a superior moisture seal thereby reducing the possibility of moisture grounds or shorting internally on traction motor armatures as installed on diesel-electric locomotive and the like. The "Pyre-ML" resins, a so-called "H" film, and "HT–1" paper materials now designated "Nomex" are all trade named products of Dupont Research and Development and the latter material is a polyamide which is a polymer of the nylon family related chemically to the polyimides.

Main generator armature coil assembly can further be provided with mating or telescopically fitted channel parts designated by numeral 21 in FIGURES 6, 7 and 8. These U-shaped channel parts 21 surround the axially or substantially longitudinally extending conductor portions of the insulated coil assembly having a material construction illustrated in a fragmentary view of FIGURE 8 for such channel means. Each channel means or part is made of moldable insulation material that is a composite of a first layering of fiberglass cloth indicated by numeral 22 on each of opposite sides in a thickness of substantially 0.001 inch. Located inwardly from the fiberglass cloth 22 on both sides there are mica splittings in so-called book-form and one hundred percent hand-laid of a size #5 (or larger). This dual layering of mica splittings is indicated by numeral 23 in FIGURE 8. As an internal or intermediate portion there is a mica "paper" core of Samica or integrated mica with a thickness of substantially 0.006 inch. This mica "paper" core or intermediate portion is designated by a reference numeral 24 in FIGURE 8 having integrated mica particles 25 therewith. The fiberglass cloth portions 22 on both sides as well as the intermediate core 24 can have a bonding agent or resin indicated by numeral 26 and exemplified by "button" shellac as well as epoxies, polyesters, acrylics, silicones and alkyds. Thickness of the mica "paper" core per se can vary with over-all thickness requirements of a finished molding plate and such make-up is based on a nominal over-all thickness of 0.014 inch. The mica splittings 23 are laid onto fiberglass cloth individually by hand and are bonded thereto by the bonding agent or resin. The mica "paper" core shall be saturated with such bonding agent or resin. The composite materials represented in FIGURE 8 are then pressed together and "B"-staged into a finished mica molding plate to have a nominal over-all thickness of 0.014 inch subject to subsequent softening by application of heat for forming into more complex forms such as channels or U-shaped parts. This insulating material is for application to coils and windings of electrical rotating machines including heavy-duty traction motors, main generators, and synchronous generators. Such moldable insulating material as represented in FIGURE 8 is superior to other mica molding plate materials by having physical and electrical properties and characteristics such as the following. The material forms more easily into more complex shapes with a far better retention of molded form. So-called shelf or storage life of these molded channels is increased in a range between thirty and sixty days or more compared with only two to four hours for previously known conventional materials. Also the new material has a more uniform thickness of which an average and individual measurement of variations can be controlled within a very narrow range as compared to other splitting-type molding plate materials. Dielectric strength is more uniform and on a higher average level than is obtained with other conventional mica plate materials. With such material an extremely high dielectric strength is obtained through use of the polyimide or "H" film backing. A reduction in costs is also possible both for material and labor.

A further step of seating coils in core slots with the opposite end turn portions or areas 12E is thus accomplished followed by a step of wedging coil conductors in armature slots. Such wedging can be accomplished in accordance with disclosures of Patents 2,945,139—Stigler et al. and 2,945,140—Drabik et al., both issued July 12, 1960, as well as 2,990,487—Stigler et al., issued June 27, 1961, and 3,009,073—Drabik et al., issued Nov. 14, 1961, all belonging to the assignee of the present invention.

Referring again to FIGURE 2, a further step of applying an uncured silicone-rubber-type material for effective moisture seal around conductor end turns for electrical machine armatures can be accomplished in accordance with the procedure outlined by FIGURE 1 by applying such uncured silicone-rubber-type material at predetermined locations identified by reference numerals 27 and 28 at opposite ends of the armature core 10 where said core abuts end turn supports 36, and at the commutator riser means 19 as designated by reference numeral 29 and at the pinion end portion 20 as designated by the reference numeral 30 where adjacent end turn supports respectively abut. Filling of these areas adjacent to the core as well as to one side of the commutator riser and peripherally adjacent to the pinion end bell is preparatory for glass banding that occurs subsequent to a pair of additional preliminary steps.

As indicated in FIGURE 1, subsequent to the applying of silicone-rubber-type material in the predetermined locations, there is a step of sheeting polytetrafluoroethylene covering material 31 peripherally around the end turn portions 12E of the armature coil assembly axially adjacent to opposite ends of the magnetic core 10 such that edging of the sheeting of polytetrafluoroethylene covering material 31 engages the silicone-rubber-type material in locations 27 and 29 as well as 28 and 30 respectively.

After this step of sheeting the polytetrafluoroethylene covering material in place, there is a step of intermediately covering the polytetrafluoroethylene material with a glass-backed silicone rubber (cured) sheet 32 around the end turn areas. The polytetrafluoroethylene or "Teflon" sheeting can be a thin film material having a thickness of substantially 0.005 inch and the glass-backed silicone-rubber covering 32 can have a thickness of substantially 0.020 inch.

The step of glass banding outer surfacing of end turn areas provides radial support for end portions of wound rotor or armature coils by banding resin-saturated glass-tape under tension to provide coil pull down or radially inwardly retention of the end turns against centrifugal forces. Such banding per se is commercially available. As indicated in FIGURE 2 of the drawings, glass banding 33 is applied continuously in a solidly spiralled configuration to fill in and close space axially between the magnetic core 10 and commutator riser means 19 directly onto the glass-backed silicone-rubber sheeting. At an opposite or pinion end of the dynamoelectric machine, banding portions 34 and 35 are provided in a similar manner. The step of banding under tension of a shrinkable glass tape having resin impregnation occurs with application of pull-down tensioning force of substantially 400 pounds subject to further tightening due to shrinkage of the resin impregnated tape material during a final step of heating for a predetermined time within a range of temperature for bonding and positively sealing together in a finally cured unitary mass. Polymerizing gases can pass through the resin impregnated glass tape and extruding of resin material therethrough results in a substantially flat or smooth outer surfacing which is glossy and free of radial cracks or blemishes during subsequent aging. The unitary mass adheres solidly to prevent any possible unwinding or loosening during dynamoelectric machine operation.

The final step of heating indicated in FIGURE 1 can occur during a baking operation in an oven for curing the banded armature at 160 to 170 degrees centigrade for a minimum period of six hours for example. Gas fired or electric ovens of convection or infra-red type can also be used for this final heating. Also a localized heating using commercially available, high frequency, high current induction heating equipment of sufficient kilowatt capacity to produce the heating results desired can be provided in at least a semiarcuate configuration without any direct electrical connection to the armature winding. Such localized heating by electro-magnetic induction can produce very rapid "inside-out" heating in order that solvents or reactive materials may be released from sealant materials prior to finish surfacing externally thereof.

The procedure in accordance with the present invention provides a positive seal through bonding of the sheet-silicone-rubber material as well as the polytetrafluoroethylene or Teflon to the silicone rubber compound plus the additional seal obtained by coating of the armature core with a heat-reactive varnish or resin material prior to winding. This method of providing an effective moisture seal for rotating electrical machine armatures eliminates need for any final varnish-impregnation or varnish dip operation. Further improvement in accordance with the present invention can occur by providing features in accordance with views of FIGURES 3, 4 and 5 of the drawings wherein the same core having end turn supports, commutator riser and pinion end bell arrangement is shown as indicated by the same reference numerals as used in FIGURE 2. In this embodiment coil end turns similar to those indicated previously are to be retained radially on the armature in locations at opposite ends of the core over the end turn supports. Suitable insulating material for such end turns and anchoring thereof can be provided subject to addition of a polytetrafluoroethylene or Teflon banding or sleeve 41 and 42 respectively in locations to each side of the magnetic core 10 over the end turn supports. Spaced a predetermined distance therefrom a glass-polyester tape means 43 and 44 can be added axially between the core and end bell 20 at predetermined spacing. Similarly, a glass polyester banding or tape layering 45 can be provided immediately adjacent to the commutator riser means 19. In accordance with the present invention rounded edge restraints are provided for the glass banding. Such edge restraints comprise use of a woven asbestos cloth means for example identified by reference numeral 46 at the commutator end banding in FIGURE 5 as well as by reference numeral 47 and reference numeral 48 at the pinion end "twin" banding in the same view. Opposite annular nylon or polyamide tubing or rod-like means generally indicated by numeral 50 in views of FIGURES 3, 4 and 5 can be provided with folded back flaps or flanges 46f, 47f and 48f for the cloth portions 46, 47 and 48 respectively in FIGURE 5. The annular tubing together with such flaps or flanges provide edge restraints for glass banding at opposite axial ends thereof whereby resin-impregnated banding means 51, 52, and 53 fitted radially outwardly from cloth portions 46, 47 and 48 respectively can be fixed accurately to predetermined fiberglass band width dimensions without need for special tooling such as metal rings and to provide a base or channel in an anular configuration for resin-saturated uni-directional fiberglass banding applied to rotating electrical machine armatures of large traction-type motors, main generators and the like. The unique tubular or corded-edge band restraint portions 50 with a unitary varnish or resin treated woven asbestos cloth provides several advantages. These advantages include a non-abrasive pad-barrier between the uni-directional fiberglass banding material and the woven glass banding for insulation of armature coil assemblies such as illustrated in FIGURE 9 thereby preventing any wearing away of the insulation of the armature coil assemblies resulting from possible expansive and contractive movement of the coils due to heating during operation. Also uniform width banding without necessity for providing special tooling such as metal rings can be accomplished by restraining the band edges within desired limits. A reduction in glass banding application time and the saving of material such as a metal restraint ring as well as maintenance costs thereof can be eliminated. The rounded band edging results in an improvement in band appearance and performance. Also the rounded band edging eliminates possibility of resin-poor areas along band edging due to restraint against resin escape along edging and elimination of consequent peeling-off glass threads and fibers from banding edges and surfaces.

Referring to FIGURES 3 and 4, it is to be noted that the restraint edging generally indicated by numeral 50 with the annular tubing or rod-like ported edge can be accomplished by folded or flanged edging F per se as indicated in FIGURE 3 together with the asbestos or insulating cloth C. Similarly the folded back portions f designated in FIGURE 4 can be provided with stitching s on cloth means 60. Woven asbestos cloth can have a thickness in a range between 0.025 and 0.030 inch and the tubing of nylon and the like can have an outer diameter of substantially three sixteenths of an inch with a wall thickness of 0.025 inch minimum. The thread for sewing as indicated in FIGURE 4 can be cotton or nylon. The glass banding with such edge restraint means controls exact band widths in addition to providing improved glass banding through more uniform resin distribution and elimination of resin-poor areas along band edging.

It is to be understood that features of the present invention can be used for dynamoelectric machines including motors and generators of various sizes. On some dynamoelectric machines the band edge restraint means can be used for only pinion ends thereof. The band edge restraints however are limited not only to use on motors such as for traction or locomotive equipment where rotational speeds above one thousand r.p.m. are encountered but also on main generators which operate at less than one thousand r.p.m.

While the embodiments of the present invention as herein disclosed constitute preferred forms, it is to be understood that other forms might be adopted.

What is claimed is as follows:

1. A method of sealing armatures of the type which provide a support for the armature winding end turns against moisture, comprising the steps of, initially insulating bare armature core areas with a partially polymerized heat-reactive material, winding the armature with armature coils having conductors basically coated with heat-stable resin material, seating the armature coils in armature core slots with opposite end turn areas of said coils resting on the end turn supports, wedging the armature coils in the armature slots, applying silicone-rubber compound at opposite ends of the armature core slots as well as axially spaced therefrom at the commutator riser and pinion end portions adjacent the armature coil end turn supports, wrapping fluorine-containing covering material peripherally at opposite ends axially of the armature core along the coil end turn areas, intermediately covering the fluorine-containing material around the end turn areas with a glass-backed cured silicone rubber sheet, glass banding the outer surfacing of the end turn areas after said sheeting and covering and finally heating for a predetermined time within a range of temperature for bonding and positively sealing together into a unitary mass the heat-reactive material, the silicone-rubber compound, the fluorine-containing covering, the glass-backed silicone rubber sheet and the glass banding.

2. The method of claim 1 wherein said initial insulating step is a dip in "B" stageable heat-reactive insulating material which is a solvent-based organic compound derived from diphenyl oxide having carbon atoms thereof arranged in a ring-shaped molecular structure.

3. The method of claim 1 wherein said initial insulating step is a coating with "B" stageable heat-reactive insulating material which is an organic compound derived from diphenyl oxide having carbon atoms thereof arranged in a ring-shaped molecular structure with toluol as a solvent.

4. The method of claim 1 wherein said finally heating step is for substantially six hours at a temperature in a range between 160 and 170 degrees centigrade for cure of said banding.

5. A method of sealing armature assemblies of the type which provide a support for the armature winding end turns against moisture in steps comprising, initially insulating bare armature core areas with a solvent-based heat-reactive material such as varnish, resin and the like made tacky in "B" stage during brief baking to drive off volatiles, winding the armature with armature coils having conductors basically coated with polyimide-polymer heat-stable resin material subject to baking to soften the insulation, seating the armature coils in armature core slots by pressure with opposite end turn areas of said coils resting on the end turn supports, wedging the armature coils into the armature slots, applying banding for the armature coil end turns by filling silicone rubber compound to the rear of the commutator riser as well as to pockets adjacent the core of both commutator and rear ends, covering the entire commutator and rear end areas with a fluoride-containing silicone-rubber sheeting material, applying resin-impregnated glass banding to cover the entire commutator and rear ends and finally curing by baking the armature for a predetermined time and range of temperature to form a unitary mass in positive sealing relationship due to bonding thereby between the sheeting and silicone rubber compound.

6. The method of claim 5 wherein said step of applying of glass banding includes edge restraining thereof to avoid possibility of resin-poor areas and consequent peeling-off of glass threads and fibers from band edges and surfaces.

7. A method of sealing armature assemblies of the type which provide a support for the armature winding end turns against moisture in steps comprising, initially insulating bare armature core areas by dipping, coating and the like with heat-reactive organic material derived from diphenol oxide having carbon atoms in an aromatic ring-shaped structure with toluol as resin solvent made tacky in "B" stage during brief baking to drive off volatiles, winding the armature with armature coils having conductors basically coated with polyimide-polymer heat-stable resin material based on a N-methylpyrolidone dimethylacetamide/toluol solvent system subject to baking to soften the insulation, seating the armature coils in armature slots by pressure with opposite end turn areas of said coils resting on the end turn supports, wedging the armature coils into slot positioning, applying banding for the armature coil end turns by filling the rear of the commutator riser, the pockets adjacent the core of both commutator and rear ends and adjacent the rear end bell portion with a silicone rubber compound, covering the entire commutator and rear ends with a polytetrafluoroethylene sheeting material, applying resin-impregnated glass banding to cover entire commutator and rear ends and finally curing by armature baking for a minimum of six hours at a temperature ranging between 160 and 170 degrees centigrade.

8. The method of claim 7 wherein said step of applying glass banding includes restraining thereof with curled back sides of asbestos cloth surrounding nylon tubing positively to limit said banding and to avoid possibility of resin-poor areas and consequent peeling-off of glass threads and fibers from band edges and surfaces.

References Cited

UNITED STATES PATENTS

| | | | |
|---|---|---|---|
| 2,896,100 | 7/1959 | Anxelson | 310—271 |
| 2,949,555 | 8/1960 | Paul | 310—271 |
| 2,970,936 | 2/1961 | Richardson. | |
| 3,079,519 | 2/1963 | Kitson et al. | 310—206 |
| 3,173,194 | 3/1965 | Applegate | 29—155.53 |

JOHN F. CAMPBELL, *Primary Examiner.*

R. W. CHURCH, *Assistant Examiner.*